United States Patent [19]
Fenske et al.

[11] 3,917,738
[45] Nov. 4, 1975

[54] ISOPARAFFIN-OLEFIN ALKYLATION UTILIZING CRYSTALLINE ALUMINOSILICATE CATALYST IN AN ADSORPTION ZONE

[75] Inventors: Ellsworth R. Fenske, Palatine; Robert F. Anderson, La Grange Park, both of Ill.

[73] Assignee: Universal Oil Products Company, Des Plaines, Ill.

[22] Filed: May 16, 1974

[21] Appl. No.: 470,413

[52] U.S. Cl. .......................................... 260/683.43
[51] Int. Cl.[2] .......................................... C07C 3/52
[58] Field of Search ................... 260/683.43, 683.53

[56] References Cited
UNITED STATES PATENTS

| | | | |
|---|---|---|---|
| 3,251,902 | 5/1966 | Garwood et al. | 260/683.43 |
| 3,647,916 | 3/1972 | Caesar et al. | 260/683.43 |
| 3,655,813 | 4/1972 | Kirsch et al. | 260/683.43 |

Primary Examiner—Delbert E. Gantz
Assistant Examiner—G. J. Crasanakis
Attorney, Agent, or Firm—James R. Hoatson, Jr.; Thomas K. McBride; William H. Page, II

[57] ABSTRACT

A process for alkylating an isoparaffin with an olefin using a solid, particulate catalyst capable of adsorbing the olefin. The isoparaffin and the olefin are admixed to form a reactants stream in contact with catalyst particles at the upstream end of an adsorption zone; the reactants stream and catalyst particles are passed cocurrently through the adsorption zone without back mixing, at controlled relative velocities, so that a controlled amount of olefin is adsorbed onto the catalyst and removed from the reactants stream as the catalyst and hydrocarbons are passed cocurrently through the adsorption zone; reactants stream and catalyst particles having olefin adsorbed thereon are withdrawn from the downstream end of the adsorption zone and contacted in an alkylation reaction zone to alkylate the isoparaffin with previously adsorbed olefin; and the alkylation reaction product is recovered from the hydrocarbon effluent from the alkylation zone.

9 Claims, 1 Drawing Figure

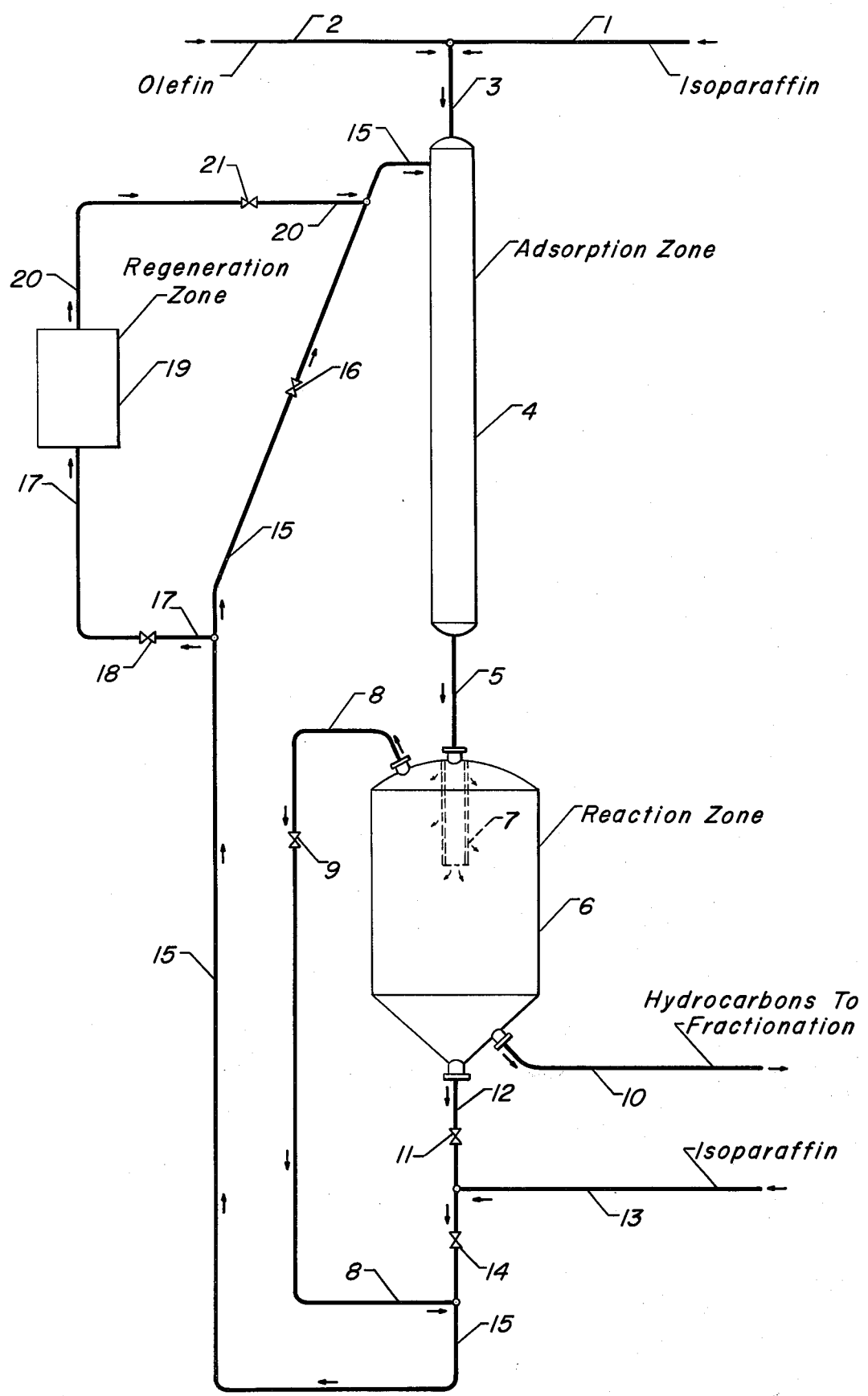

ISOPARAFFIN-OLEFIN ALKYLATION UTILIZING CRYSTALLINE ALUMINOSILICATE CATALYST IN AN ADSORPTION ZONE

BACKGROUND OF THE INVENTION

The present invention relates to a process for producing an alkylation reaction product from an isoparaffinic hydrocarbon and an olefin. More specifically, this invention relates to a process for alkylating an isoparaffin with an olefin using a solid alkylation catalyst in particulate form.

In one aspect, the present invention relates to an isoparaffin-olefin alkylation process wherein a controlled amount of the olefin is adsorbed onto a solid alkylation catalyst in an adsorption zone in the presence of the isoparaffin, and resulting adsorbed olefin and at least a portion of the isoparaffin are then reacted in an alkylation reaction zone to provide an alkylation reaction product. In another aspect the present invention relates to a process for reacting lower molecular weight isoparaffins with lower molecular weight olefins to provide higher molecular weight branched-chain hydrocarbons suitable for use in motor fuel.

Alkylation of isoparaffinic hydrocarbons, such as isobutane and isopentane, with olefins such as ethylene, propylene, butylenes and amylenes, or with other olefin-acting agents such as alkyl halides, alkyl sulfates, alkyl phosphates, alcohols, ethers, etc., is known in the art. Alkylation processes employing liquid or slurry catalysts such as hydrogen fluoride, sulfuric acid, aluminum chloride and other Friedel-Crafts metal halides, etc., are well known as commercially important methods for producing gasoline boiling range hydrocarbons. The hydrocarbon products provided by isoparaffin-olefin alkylation are termed "alkylate." Alkylate is particularly useful as a motor fuel blending stock. It possesses motor and research octane ratings sufficiently high that it may be used to improve the overall octane rating of available gasoline pools in order to provide motor fuel which complies with the high octane requirements of modern automobile motors. High octane alkylate fuel components are particularly important in the production of motor fuel of sufficiently high octane when it is desired not to employ alkyl lead compounds in the motor fuel to meet octane requirements. A continuing goal in the alkylation art is to provide an economical alkylation process which produces an alkylate product having motor and research octane ratings which are higher than can be provided by conventional alkylation operations.

Although alkylation processes using liquid, acidic catalysts such as hydrogen fluoride and sulfuric acid are commercially successful, there some inherent disadvantages in use of such catalysts. These include, in particular, problems associated with the handling and disposal of corrosive materials. Generally, employment of conventional liquid catalysts in hydrocarbon processing has necessitated the use of processing schemes and equipment which are more complex and expensive than corresponding hydrocarbon processing operations using solid catalysts. For this reason, and others, substantial efforts have been made to develop a viable isoparaffin-olefin alkylation process which uses a solid catalyst. Heretofore, however, the art has been unsuccessful in providing an isoparaffin-olefin alkylation process using a solid catalyst which has found commercial acceptance. Examples of various prior art attempts to provide an alkylation process using a solid catalyst may be found in the following. U.S. Pat. No. 3,251,902 teaches the use of an ion-exchanged crystalline aluminosilicate having a reduced number of available acid sites in fixed bed, liquid phase alkylation of $C_4$-$C_{20}$ branched-chain paraffins with $C_2$-$C_{12}$ olefins, and teaches that the $C_4$-$C_{20}$ branched-chain paraffin should be allowed to substantially saturate the crystalline aluminosilicate before the olefin, is introduced to the alkylation reactor. U.S. Pat. No. 3,450,644 discloses a method for regenerating a zeolite catalyst used in hydrocarbon conversion processes involving carbonium ion intermediates. U.S. Pat. No. 3,541,180 discloses a method for improvement of thermal alkylation processes for reacting isobutane with ethylene or propylene which involves using solid sodalite or ultramarine catalysts. U.S. Pat. No. 3,549,557 teaches alkylation of isobutane with $C_2$-$C_5$ olefins using certain crystalline aluminosilicate zeolite catalysts in fixed bed, moving bed or fluidized bed systems, with olefin being preferably injected at various points in a fixed bed system. U.S. Pat. No. 3,644,565 teaches alkylation of a paraffin with an olefin in the presence of a catalyst comprising a Group VIII noble metal distended on a crystalline aluminosilicate zeolite, where the catalyst is pretreated with hydrogen to promote selectivity. U.S. Pat. No. 3,647,916 teaches an isoparaffin-olefin alkylation process using an ion-exchanged crystalline aluminosilicate, which includes alkylating at isoparaffin/olefin molar ratios below 3:1 and regenerating the catalyst. U.S. Pat. No. 3,655,813 discloses a process for alkylating $C_4$-$C_6$ isoparaffins with $C_3$-$C_9$ olefins using a crystalline aluminosilicate zeolite catalyst, wherein a halide adjuvant is employed in the alkylation reactor, isoparaffin and olefin are introduced into the alkylation reactor at specified concentrations, and catalyst is continuously regenerated outside the alkylation reactor. U.S. Pat. No. 3,706,814 discloses an isoparaffin-olefin alkylation process, using a crystalline aluminosilicate zeolite catalyst, which includes addition of $C_6$+ paraffins "such as Udex raffinate" or $C_9$+ olefins to the hydrocarbon feed to the alkylation reactor, and also involves the use of specific reactant proportions, halide adjuvants, etc. Various solid catalysts useful in isoparaffin-olefin alkylation have been disclosed in the above-listed patents and also, for example, in the following. U.S. Pat. No. 3,236,761 discloses the use, in alkylation, of crystalline aluminosilicate zeolites having silica to alumina mole ratios above 3 and also discloses the use of various metals exhanged and/or impregnated on such zeolites. U.S. Pat. No. 3,624,173 discloses the use, in isoparaffin-olefin alkylation, of crystalline aluminosilicate zeolites containing gadolinium. U.S. Pat. No. 3,738,977 discloses alkylation of paraffins with ethylene using a crystalline aluminosilicate with a Group VIII metal distended thereon in which the catalyst has been pretreated with hydrogen.

The above-noted patents are illustrative of the variety and complexity of attempts in the art to utilize solid catalysts in isoparaffin-olefin alkylation. Such prior art attempts at adapting solid catalysts for use in alkylation have not met commercial acceptance. Some of the reasons for the lack of success of the art in providing an acceptable isoparaffin-olefin alkylation process employing a solid catalyst, e.g., a crystalline aluminosilicate zeolite, include, for example, overly rapid catalyst deactivation, the unduly long hydrocarbon residence times required, the excessively high isoparaffin/olefin mole ratios required in reactor feeds, the excessive amounts of side reaction products produced, such as olefin polymerization products, and the correspondingly low yield of alkylate. When crystalline aluminosiliate molecular sieves are employed as the alkylation catalyst, catalyst deactivation and olefin polymerization have been found to be relatively severe problems. It is believed that olefin polymerization and catalyst deactivation are closely related in that deactivation may, in many cases, be caused by plugging of the catalyst pores with polymers.

SUMMARY OF THE INVENTION

It is an object of the present invention to provide a process for alkylating an isoparaffin with an olefin utilizing a solid catalyst.

It is another object of the present invention to provide a reduction in the rate of olefin polymerization in an alkylation process employing a solid catalyst.

It is another object of the present invention to prolong active catalyst life in an alkylation process employing a solid catalyst.

It is another object of the present invention to provide an alkylation reaction product having superior quality by an alkylation process employing a solid catalyst.

In an embodiment, the present invention relates to a process for producing an alkylation reaction product from an alkylatable hydrocarbon and an olefin utilizing a solid catalyst in particulate form, the catalyst having the capacity to adsorb the olefin, which comprises the steps of: continuously passing the alkylatable hydrocarbon and the olefin into the upstream end of an adsorption zone to form a reactants stream, continuously passing the catalyst into the upstream end of the adsorption zone, continuously passing the reactants stream and the catalyst, in contact at adsorption conditions, cocurrently from the upstream end to the downstream end of the adsorption zone, whereby at least a portion of the olefin is adsorbed onto the catalyst from the reactants stream, the concentration of the olefin in the reactants stream being greater at the upstream end than at the downstream end of the adsorption zone and the concentration of the olefin adsorbed onto the catalyst being greater at the downstream end than at the upstream end of the adsorption zone; continuously removing the catalyst and the reactants stream from the downstream end of the adsorption zone and contacting at least a portion of the reactants stream removed from the adsorption zone with at least a portion of the catalyst removed from the adsorption zone in an alkylation reaction zone at alkylation conditions, whereby at least a portion of the olefin adsorbed on the catalyst is reacted with the alkylatable hydrocarbon to form the alkylation reaction product; and recovering the alkylation reaction product from the effluent from the alkylation reaction zone.

We have found that when a solid catalyst, such as crystalline aluminosilicate zeolite, is contacted with an amount of olefin feed not greater than the amount which that catalyst is capable of adsorbing, it is possible to avoid olefin polymerization, and catalyst deactivation is accordingly reduced. In the process of the present invention, a liquid reactants stream (containing isoparaffin and olefin) and catalyst particles are passed cocurrently through an adsorption zone at controlled relative velocities without back mixing. The amount of olefin which contacts any particular catalyst particle may thereby be controlled. The concentration of olefin in the reactants stream formed at the upstream end of the adsorption zone is held at a level such that substantially all the olefin in the reactants stream is adsorbed onto the catalyst during passage of the catalyst and reactants stream through the adsorption zone. By maintaining cocurrent flow of catalyst and reactants and avoiding back mixing, the concentration of olefin in the reactants stream is reduced when the olefin is adsorbed. Thus, by the time the adsorptive capacity of any particular catalyst particle is fully utilized, there is substantially no further olefin in the part of the reactants stream in contact with that particle to react with adsorbed olefin thereon and polymerization of the olefin is thereby avoided. All or part of the olefin-depleted reactants stream and catalyst are subsequently passed to an alkylation reaction zone, wherein olefin previously adsorbed onto the catalyst in the adsorption zone is reacted with isoparaffin to produce the desired alkylation reaction product.

Further objects, embodiments and advantages of the process of the present invention will be apparent to those skilled in the art from the description of the attached drawing and detailed description of the invention provided hereinafter.

DESCRIPTION OF THE DRAWING

The attached drawing is a schematic illustration of one preferred embodiment of the process of the present invention. The broad scope of the present invention is not limited to the embodiment thereby depicted. Other suitable embodiments will be apparent to those skilled in the art from the description of the invention provided herein.

Referring to the drawing, makeup isoparaffin and isoparaffin recycled to the process from conventional alkylate separation operations are charged to the process through conduit 1. Olefin is charged to the process through conduit 2. The olefin and makeup and recycled isoparaffin are admixed in conduit 3. The resulting mixture is passed through conduit 3 into the upstream end of the adsorption zone 4. A slurry of solid, particulate form alkylation catalyst in liquid phase isoparaffin is passed into the upstream end of the adsorption zone 4 from conduit 15. The isoparaffin introduced to adsorption zone 4 from conduit 15 and the mixture of olefin and isoparaffin introduced from conduit 3 are admixed to form a reactants stream at the upstream end of adsorption zone 4. The hydrocarbon reactants stream and catalyst particles are passed cocurrently through adsorption zone 4, without back mixing of solids or liquids. Adsorption conditions maintained in adsorption zone 4 include a temperature of about 150°F., a pressure sufficient to maintain the isoparaffin and olefin as liquids, a catalyst residence time of about 1 minute and a reactants stream residence time of about 2 minutes. As the reactants stream and catalyst particles pass from the inlet of conduit 15 at the upstream end of adsorption zone 4 to the outlet into conduit 5 at the downstream end of adsorption zone 4, olefin is adsorbed onto the catalyst particles. The concentration of olefin in the liquid phase reactants stream hydrocarbon mixture is thus reduced continuously during the cocurrent passage of the catalyst particles and reactants stream through adsorption zone 4, while the concentration of olefin adsorbed onto the catalyst particles is correspondingly increased. The reactants stream is substantially free from olefin at the downstream end of adsorption zone 4, and contains primarily isoparaffin along with, in some cases, a small amount of alkylation reaction products. The olefin-depleted, liquid phase reactants stream and catalyst particles having olefin adsorbed thereon are removed from the downstream end of adsorption zone 4 through conduit 5. The admixture of catalyst particles and olefin-depleted reactants stream is passed through conduit 5 into alkylation reaction zone 6, and into porous conduit 7 within reaction zone 6. Liquid hydrocarbons pass through the walls of porous conduit 7, while catalyst particles charged to porous conduit 7 are too large to pass through the pores thereof and are discharged at a relatively central point within reaction zone 6 at the lower end of conduit 7. The use of porous conduit 7 facilitates settling of catalyst particles to the bottom of reaction zone 6. Withdrawal of a substantial portion of the olefin-depleted liquids from reaction zone 6 by way of conduit 8, as described below, might otherwise hinder settling of catalyst particles. While the catalyst particles charged to reaction zone 6 are settled, a major portion of the olefin-depleted liquids charged to reaction zone 6 is withdrawn from the upper end thereof via conduit 8. Thus, a substantial portion of the liquids passed into porous conduit 7 pass through the walls of conduit 7 and directly out of reaction zone 6 into conduit 8. The amount of liquids withdrawn from reaction zone 6 into conduit 8 is regulated by adjustments of valve 9 to provide sufficient liquids to transport catalyst particles as hereinafter described. Referring again to reaction zone 6, alkylation conditions maintained therein include a temperature of about 150°F., a pressure sufficient to maintain liquid phase operations, a catalyst residence time of about 60 minutes and a hydrocarbon residence time of about 60 minutes. In reaction zone 6, olefin which was previously adsorbed onto the catalyst particles in adsorption zone 4 is reacted with isoparaffin to form higher molecular weight alkylation reaction products, which are desorbed into the liquid hydrocarbon phase present in reaction zone 6. After the alkylation reaction of all adsorbed olefin is complete, catalyst particles are separated from most of the hydrocarbons in reaction zone 6. A liquid mixture of hydrocarbons, comprising alkylation reaction products and unreacted isoparaffins, is removed from reaction zone 6 by way of conduit 10 and passed to conventional product separation and purification operations not shown. Olefin-free catalyst particles are withdrawn from reaction zone 6 via conduit 12. In removing olefin-free catalyst particles from reaction zone 6 into conduit 12, valve 11 is opened and valve 14 is closed. A portion of olefin-free catalyst particles is thereby allowed to settle or flow into conduit 12. Isoparaffin is introduced into conduit 12 via conduit 13 at a point near valve 14 in order to flush alkylation reaction product from the portion of catalyst in conduit 12 upstream of valve 14. The isoparaffin and flushed alkylation reaction product flow from conduit 12 into reaction zone 6. After the alkylation reaction product has been desorbed and flushed from the portion of catalyst within conduit 12 upstream of valve 14, the flow of isoparaffin through conduit 13 into conduit 12 is discontinued. Valve 11 is then closed and valve 14 is opened. Catalyst free from olefin and alkylation reaction product is thus allowed to flow or settle through conduit 12 into conduit 15. The liquid hydrocarbon stream in conduit 8, consisting of isoparaffin, is passed into conduit 15 in order to form a slurry therein with the catalyst particles in order to facilitate transportation of the catalyst particles. Depending upon the degree of catalytic deactivation of the catalyst particles in conduit 15, it may be desirable to pass all, or a portion of, the catalyst particles in conduit 15 into regeneration zone 19 for conventional regeneration. In cases where the catalyst particles in conduit 15 are sufficiently active that regeneration is not required, valve 18 and valve 21 are closed and valve 16 is opened. The slurry of catalyst particles in isoparaffin in conduit 15 is then passed directly through conduit 15 back into adsorption zone 4, as described above. In cases where the catalyst particles in conduit 15 are relatively deactivated and complete regeneration of the catalyst is desired, valve 16 is closed and valve 18 and valve 21 are opened. Catalyst is thereby passed from conduit 14 through conduit 17 into regeneration zone 19. In regeneration zone 19 catalyst is regenerated in a conventional manner, such as by contacting the catalyst with hydrogen gas in the presence or absence of the isoparaffin in order to remove the carbonaceous contaminants which deactivate the alkylation catalyst. Regenerated catalyst is then passed, in the form of a slurry, out of regeneration zone 19 through conduit 20 and into conduit 15 for further use in adsorption zone 4 as described above. In cases where it is desired to regenerate only a portion of the catalyst particles in conduit 14, valve 16, valve 18 and valve 21 are all adjusted to permit the desired portions of catalyst slurry to pass both through conduits 17 and 20, and directly through conduit 15, resulting in both regenerated and unregenerated catalyst being passed into adsorption zone 4 via conduit 15 in this mode of operation. Standard ancillary equipment, such as pumps, heat exchange means and control means, etc., is not shown in the attached drawing and has not been described in the foregoing. Such conventional equipment and its operation and use in the present process will be obvious to those skilled in the art from the foregoing description and from the following detailed description of the invention.

DETAILED DESCRIPTION OF THE INVENTION

The isoparaffins suitable for use in the present process includes those generally employed in prior art isoparaffin-olefin alkylation processes. The preferred isoparaffins are isobutane and isopentane, particularly isobutane. A mixture of two or more suitable isoparaffins such as isobutane and isopentane may also be employed with good results. Feedstocks employed to provide the isoparaffinic reactant in the present process may be conventional isoparaffin alkylation feedstocks and may contain conventional amounts of nonreactive contaminants such as normal paraffins. For example, a conventional isobutane alkylation feedstock generally contains some n-butane and some propane.

The olefins which are suitable for use in the process of the present invention include $C_2$—$C_{20}$ mono-olefins in general. The $C_2$—$C_5$ olefins, i.e., ethylene, propylene, butylenes and amylenes, are particularly preferred. Mixtures of two or more suitable olefins may also be employed to provide the olefinic feed in the present process with good results. For example, conventional olefin feedstocks used in commercial isoparaffin-olefin alkylation processes may be used in the present process. Such feedstocks contain mixtures of propylene and butylenes, butylenes and amylenes, or all three of the above. In the present process, conventional ethylene feedstocks or mixtures are also suitable.

The benefits of the present process may be obtained using such conventional feedstocks as well as when using a single olefin. The conventional olefin feedstocks preferred for use in the process may be derived from petroleum refining operations such as catalytic cracking and may therefore contain substantial amounts of saturated hydrocarbons and heavier olefins.

Any solid catalyst which can be manufactured in particulate form so as to be transportable in a liquid hydrocarbon slurry, may be utilized as the catalyst in the present process providing three conditions are met: (1) the catalyst must be capable of adsorbing the $C_2$—$C_{20}$ olefins employed in the present process as described above; (2) the catalyst must be capable of catalyzing the alkylation reaction between the isoparaffin reactant and adsorbed olefin reactant utilized in the present process; and (3) the rate of olefin adsorption by the catalyst must be more rapid than the rate of reaction of adsorbed olefin with isoparaffin to form alkylation reaction products. The selection of a suitable catalyst for use in the present process is within the ability of those skilled in the art. If the above conditions are met by solid catalyst compositions, the use of any particular composition as the catalyst in the present process is not essential to the invention thereof. The preferred catalysts for use in the present process are crystalline aluminosilicate zeolites which are capable of preferentially adsorbing $C_2$—$C_{20}$ olefins, especially $C_2$—$C_5$ olefins. The preferred zeolites are those which have a pore size sufficiently large to desorb the alkylation reaction product produced in the present process. For example, when isobutane and a butene are to be employed as the isoparaffinic and olefinic reactants, respectively, the alkylation reaction product will comprise $C_8$ isoparaffins and a suitable zeolite employed as the catalyst preferably will have a pore size sufficiently large that the catalyst is capable of adsorbing or desorbing $C_8$ isoparaffins. Appropriate zeolites having the desired pore sizes and conventional methods for manufacturing them will be apparent to those skilled in the art. The catalytic activity of various zeolites in catalyzing the isoparaffin-olefin alkylation has been disclosed in prior art. Such zeolites as mordenites and particularly faujasites are suitable. Suitable zeolites may be base exchanged and in some cases acid exchanged in a conventional manner and may have their original sodium or potassium cations partially or wholly exchanged for other mono- or polyvalent cations such as lithium, rubidium, cesium, magnesium, calcium, strontium, manganese, iron, cobalt, silver, nickel, or rare earth metals such as lanthanum, cerium, gadolinium, dysprosium, etc., and combinations thereof. The suitable zeolites may be composited with one or more partially or wholly inert solids which are conventionally used as catalyst substrates, such as silica, alumina, clays, etc. The suitable zeolites may also be composited with metals of known catalytic activity such as Group VIII metals, especially platinum and/or palladium. The suitable zeolites may also be treated with halogens such as chlorine or fluorine to enhance their catalytic properties or may be treated with hydrogen or other gases in order to enhance their adsorptive or catalytic effects in any manner known in the art. The catalyst employed in the present process is utilized in conventional particulate form, such as spheres, pellets, etc. The particle size is not critical; however, the catalyst should be in a form suitable for transport as a slurry of catalyst particles in a liquid hydrocarbon such as an isoparaffin in order to ensure ease of operation of the process. A preferred catalyst size range is between about 10 by 40 mesh and about ⅛" diameter.

The adsorption zone utilized in the present process may be any conventional vessel capable of containing the hydrocarbons utilized in the present process in the liquid phase at the pressures and temperatures which are employed. Preferably, the length/diameter ratio of a vessel to be employed is greater than about 10:1, with a length/diameter ratio greater than about 50:1 particularly preferred. Isoparaffin and olefin are passed into the upstream end of the adsorption zone at an isoparaffin/olefin molar ratio between about 1:1 and about 100:1, preferably between about 10:1 and 75:1. The term "reactants stream" as used herein refers to nonadsorbed, liquid phase hydrocarbons formed at the upstream end of the adsorption zone. Components of the reactants stream include nonadsorbed, liquid phase olefin as well as liquid phase isoparaffin introduced into the upstream end of the adsorption zone from any source. Olefin adsorbed onto the catalyst is not a component of the reactants stream. The concentration of olefin in the reactants stream is high at the upstream end of the adsorption zone, and low at the downstream end of the adsorption zone, since olefin is adsorbed onto the catalyst during co-current passage of the catalyst and reactants stream through the adsorption zone. Isoparaffin components of the reactants stream include any isoparaffin recycled externally from the downstream end of the adsorption zone to the upstream end of the adsorption zone and any isoparaffin utilized to transport catalyst particles into the upstream end of the adsorption zone, as well as makeup isoparaffin feedstocks provided from extraneous sources and isoparaffin recycled from conventional alkylate product separation and recovery operations. The rate of catalyst charge to the upstream end of the adsorption zone is between about 1 pound and about 50 pounds of catalyst per pound of olefin charged, with a preferred rate of catalyst introduction being from about 5 pounds to about 25 pounds per pound of olefin introduced into the adsorber. The rate of introduction of catalyst into the adsorber will depend, in part, on the adsorptive capacity of the particular catalyst utilized. The rate of catalyst introduction should be at least sufficient to provide enough adsorptive capactiy to adsorb substantially all the olefin charged to the adsorber. Adsorption conditions maintained in the adsorption zone in the present process include a catalyst residence time in the adsorption zone of about 0.1 minute to about 5 minutes. A preferred catalyst residence time is between about 0.5 minute and about 2 minutes. A temperature between about 70°F. and about 250°F. is maintained in the adsorber, with a preferred temperature range being between about 125°F. and about 175°F. The pressures employed in the adsorption zone are not critical as long as they are sufficiently high to maintain the olefin, the isoparaffin and any alkylation reaction product in liquid form. Adsorption conditions maintained in the adsorption zone also include a reactants stream residence time in the adsorption zone of about 0.5 minute to about 10 minutes. A preferred reactants stream residence time in the adsorber is between about 1 minute and about 5 minutes. The hydrocarbons and catalyst are passed cocurrently through the adsorber, preferably in continuous downward flow, so that the vertical downward velocity of the catalyst particles is at least about as great as the vertical downward velocity of the liquid phase hydrocarbon passing downwardly through the adsorber. Back mixing of either catalyst or liquid phase hydrocarbons in the adsorber is to be avoided in order to ensure that only a controlled amount of the liquid phase olefin reactant is contacted with any given catalyst particle. Thus, relatively slower liquid flow rates are preferred in order to avoid undesirable amounts of turbulence in the adsorber. It is preferred that all the olefin charged to the adsorber is adsorbed onto the catalyst particles from the reactants stream before the olefin-containing catalyst and liquid phase hydrocarbons are withdrawn from the adsorber, so that the liquid reactants stream removed from the adsorber is substantially free from olefin. The liquid hydrocarbon effluent removed from the adsorber thus consists almost completely of isoparaffin.

The catalyst withdrawn from the adsorption zone and at least a portion of the reactants steam withdrawn from the adsorption zone are passed into the alkylation reaction zone and contacted therein at alkylation conditions. As indicated above, when the reactants stream is withdrawn from the downstream end of the adsorption zone, it is substantially free from olefin, the olefin charged to the adsorption zone having been substantially all adsorbed onto the catalyst within the adsorption zone. Thus, the reactants stream withdrawn from the adsorption zone consists almost solely of liquid phase isoparaffin. It is not essential to the present process to pass the whole of the reactants stream removed from the adsorber into the alkylation reaction zone. It is, however, essential to pass all the catalyst removed from the adsorber into the alkylation reaction zone. Portions of the reactants stream removed from the adsorber which are in excess of the amount required in the alkylation reaction zone may be recycled externally directly to the upstream end of the adsorber for further use in the adsorber or may be employed to transport catalyst particles as a slurry from the outlet of the alkylation reaction zone back to the upstream end of the adsorption zone.

The alkylation reaction zone may be any conventional vessel capable of containing isoparaffin and alkylation reaction product under pressures sufficient to ensure liquid phase operations at the desired reaction temperatures. If it is desired to remove liquid hydrocarbons from the alkylation reactor separately from catalyst particles therein, means for retaining catalyst in the reactor, such as a screen over the liquid hydrocarbon outlet, should be included in order to avoid entrainment of catalyst particles in the liquid hydrocarbons withdrawn. Catalyst may be separately removed by use of a liquid cyclone, lock hoppers, or other suitable conventional means, if desired, after reaction of any previously adsorbed olefin and desorption of the reaction product within the reaction zone. Alternatively, liquid hydrocarbons and catalyst particles may be removed from the alkylation reactor in admixture, after reaction of the olefin, and desorption of the alkylation reaction product. The catalyst and hydrocarbons are then mechanically separated, by any conventional method, outside the alkylation reactor.

Alkylation conditions employed in the alkylation reaction zone include a temperature in the range from about 70°F. to about 250°F., with a preferred temperature range being between about 125°F. and 175°F. Pressures employed are not critical as long as they are sufficient to ensure that the hydrocarbons within the alkylation reactor are primarily in the liquid phase. Alkylation conditions also include a catalyst residence time of about 0.25 hour to about 4 hours. Hydrocarbon residence time is not critical as long as at least about 1 minute is provided to allow substantially complete adsorption of any small quantities of olefin which were not adsorbed in the adsorption zone. Preferably, a catalyst residence time between about 0.5 hour and about 2 hours is utilized. The catalyst residence time is at least a sufficient period to ensure that all olefin adsorbed on the catalyst when the catalyst is passed into the alkylation reactor has completely reacted with isoparaffin to form the desired alkylation reaction product. The catalyst and hydrocarbons in the alkylation reactor may simply be allowed to stand without agitation for the desired residence time. An advantage of allowing the catalyst to stand without agitation in the reactor is that gravity settling of the catalyst particles tends to aid formation of a dense catalyst bed within the alkylation reactor, thereby facilitating separation of liquid hydrocarbons from the catalyst particles. It is desirable to flush alkylation reaction product from the catalyst after reaction of adsorbed olefin. This may be accomplished by countercurrent contact of isoparaffin with the catalyst, either within or outside the alkylation reactor, depending upon the mode desired for separation of the liquid phase alkylation reaction product and unreacted isoparaffin from the solid catalyst.

The hydrocarbons present in the alkylation reaction zone are removed therefrom after the desired residence time, separated from catalyst particles, and passed to conventional alkylate product separation operations. In such conventional product separation procedures, the hydrocarbon effluent from the reaction zone is fractionated to separate unreacted, lighter isoparaffin overhead and alkylate product bottoms. The unreacted isoparaffin may be recycled to the adsorption zone, or be employed to flush alkylation reaction product from the catalyst particles removed from the alkylation reaction zone, as described above. It may also be desirable to remove inert contaminants, such as ethane, propane, etc., from the stream of unreacted isoparaffin to be recycled when such contaminants are present in the reactant feedstocks, so as to avoid buildup of these inerts in the isoparaffin recycle system.

The catalyst particles may be transported between the adsorption zone, the alkylation reaction zone and a regeneration zone, if utilized, in any convenient manner. Preferably, the catalyst particles are transported in the form of a slurry in the isoparaffin employed. The amount of isoparaffin required in the adsorption zone in a particular embodiment, based on the amount of catalyst employed in the adsorption zone in the embodiment, is generally larger than the amount of isoparaffin required in the alkylation reaction zone in the same embodiment. Excess isoparaffin recovered from the downstream end of the adsorption zone in the form of an olefin-depleted reactants stream may, therefore, be conveniently utilized to form a slurry with catalyst recovered from the alkylation reaction zone in order to recycle both catalyst and isoparaffin for use in the adsorption zone, if desired.

Catalyst which has become deactivated in the present process may be subjected to conventional catalyst regeneration procedures such as oxidative regeneration or hydrogenative regeneration. In oxidative regeneration, catalyst particles are contacted with an oxygen-containing gas at relatively high temperatures, preferably about 700° to about 1000°F. to cause combustion and removal from the catalyst of carbonaceous deposits on the catalyst. This oxidative type of regeneration procedure is well known in the art. In hydrogenative regeneration, catalyst particles are contacted with a hydrogen containing gas at relatively mild temperatures. Hydrogenative regeneration is appropriate only when a crystalline aluminosilicate is employed as the catalyst and is composited with a catalytically active metal, and the hydrogenative procedure is preferably employed only when the catalyst contains a catalytically effective amount of platinum and/or palladium. The temperatures employed in hydrogenative regeneration are generally in the range from about 75°F. to about 300°F., with hydrogen pressures between about 0.1 atmosphere and about 1000 atmospheres. The hydrogen employed may be diluted with such inert gases as nitrogen, methane, ethane, etc. Contact times in a suitable conventional vessel of between about 5 minutes and about 6 hours are employed in conventional hydrogenative regeneration. In the present process, regeneration is preferably accomplished, if required, by passing catalyst particles recovered from the alkylation reaction zone, as a slurry in liquid phase isoparaffin, into the regeneration zone, either regenerating the catalyst while in the slurry, or separating the catalyst from the isoparaffin, regenerating the catalyst particles and subsequently reslurrying the regenerated particles with isoparaffin for transport to the adsorption zone for further use.

ILLUSTRATIVE EMBODIMENT

In order to illustrate a preferred mode of operation of the process of the present invention, a system identical to that shown in the attached drawing is employed. An olefin feed comprising mixed butylenes is passed into the process at the rate of 100 moles per hour by way of conduit 2. Makeup isoparaffin and recycled, unreacted isoparaffin comprising isobutane is passed into the process at the rate of 100 moles per hour makeup isobutane and 400 moles per hour recycle isobutane by way of conduit 1. The butylenes in conduit 2 and the isobutane in conduit 1 are mixed and passed through conduit 3 into the upstream end of adsorption zone 4. Adsorption zone 4 is a conventionally constructed vessel 100 feet high and 2 feet in diameter. The catalyst employed in the illustrative embodiment is a Y-faujasite formed into 1/64" diameter particles, which has been conventionally base exchanged, heated to decompose the base and produce the hydrogen form of the Y-faujasite, and partially ion-exchanged with rare earth metal ions. The resulting zeolite has then been composited with about 0.2 weight percent platinum, based on the weight of the zeolite. Catalyst particles are passed into adsorption zone 4 as a slurry in isobutane at the rate of 58,000 pounds per hour of catalyst and 5000 moles per hour of isobutane by way of conduit 15. The butylenes and isobutane introduced into adsorption zone 4 from conduit 3 and the isobutane introduced into adsorption 4 from conduit 15 are admixed at the upstream end of adsorption zone 4 to form a reactants stream. The catalyst particles and the reactants stream are continuously passed in downflow cocurrently through adsorption zone 4 utilizing a catalyst residence time of one minute and reactants stream residence time of two minutes. A temperature of 150° and a pressure sufficient to maintain isobutane and butylenes as liquids are employed in adsorption zone 4. Butylenes are adsorbed onto the catalyst particles during cocurrent passage of the catalyst particles and reactants stream downwardly through adsorption zone 4, so that catalyst particles at the downstream end of adsorption zone 4 contain about 0.00175 mole of butylenes per pound of catalyst. The reactants stream at the downstream end of adsorption zone 4 contains substantially no non-adsorbed butylenes and therefore consists of isobutane. Reactants stream and catalyst particles containing adsorbed butylenes are continuously withdrawn from the downstream end of adsorption zone 4 by way of conduit 5. Catalyst particles having olefin adsorbed thereon and the liquid hydrocarbons in conduit 5 are passed into alkylation reaction zone 6 at the rate of 58,000 pounds per hour of catalyst particles, 100 moles per hour of butylenes adsorbed on the catalyst particles and 5500 moles per hour of liquid phase isobutane. Catalyst is settled and allowed to stand in reaction zone 6 for a residence time of 1 hour. Liquid phase hydrocarbon comprising isobutane is withdrawn from reaction zone 6 by way of conduit 8 at the rate of 5000 moles per hour. A temperature of 150°F. and a pressure sufficient to maintain isobutane and alkylation reaction product in the liquid phase are employed in reaction zone 6. In alternating operation, valve 11 is opened and valve 14 is closed, allowing catalyst to flow into conduit 12 intermittently at the rate of 58,000 pounds per hour. Isobutane is passed into conduit 12 slightly upstream of closed valve 14 by way of conduit 13 at the rate of 200 moles per hour. The isobutane stream introduced into conduit 12 from conduit 13 is used to flush $C_5+$ alkylate products from the catalyst particles in conduit 12 back into reaction zone 6. In further alternating operation, valve 11 is then closed and valve 14 is opened, allowing catalyst particles to flow from conduit 12 into conduit 15. During the time when valve 14 is opened, the flow of isobutane into conduit 12 from conduit 13 is discontinued. Liquid hydrocarbons are passed from conduit 8 into conduit 15 at the rate of 5,000 moles per hour isobutane in order to form an isobutane-catalyst slurry in conduit 15. Hydrocarbons are withdrawn from reaction zone 6 by way of conduit 10 and passed to conventional alkylate products separation operation at the rate of 100 moles per hour $C_5+$ hydrocarbon alkylate product and 600 moles per hour isobutane. When catalyst activity is at a normal level, valve 18 and valve 21 are closed and valve 16 is opened, allowing the isobutane-catalyst slurry in conduit 15 to pass directly into adsorption zone 4 for further use as described above.

We claim as our invention:

1. An alkylation process which comprises passing a mixture of isoparaffin, olefin and crystalline aluminosilicate catalyst through an adsorption zone at adsorption conditions including a temperature of from about 70° to about 250°F., a catalyst residence time of from about 0.1 to about 5 minutes and a hydrocarbon residence time of from about 0.5 to about 10 minutes, adsorbing substantially all of said olefin in said catalyst during the passage of said mixture through said zone, then discharging the mixture into an alkylation zone maintained at alkylation conditions including an alkylation temperature of from about 70° to about 250°F., a catalyst residence time of from about 0.25 to about 4 hours and a hydrocarbon residence time of at least about 1 minute and therein reacting the olefin adsorbed in the catalyst with a portion of said isoparaffin, separately withdrawing from the alkylation zone an alkylate-containing stream, a catalyst-containing stream and an unreacted isoparaffin-containing stream, commingling said withdrawn isoparaffin-containing stream and said catalyst-containing stream and supplying said commingled streams to said adsorption zone.

2. The process of claim 1 wherein said isoparaffin is selected from isobutane and isopentane.

3. The process of claim 1 wherein said olefin is a mono-olefin selected from ethylene, propylene, 1-butene, 2-butene, isobutylene, 1-pentene, 2-pentene, 2-methyl-1-butene, 3-methyl-2-butene and 3-methyl-1-butene.

4. The process of claim 1 wherein said crystalline aluminosilicate has a faujasite crystal structure.

5. The process of claim 1 wherein said catalyst includes from about 0.01 wt.% to about 5 wt.% of a metal from Group VIII of the Periodic Table of the Elements.

6. The process of claim 1 wherein from about 1 volume to about 50 volumes of said isoparaffin is passed into said adsorption zone per volume of said olefin passed into said adsorption zone.

7. The process of claim 1 wherein at least a portion of said catalyst removed from said alkylation zone is contacted with an oxygen-containing gas in an oxidative regeneration zone at oxidative regeneration conditions, removed from the regeneration zone and passed into said adsorption zone.

8. The process of claim 5 wherein at least a portion of said catalyst removed from said alkylation zone is contacted with a hydrogen-containing gas in a hydrogenative regeneration zone at hydrogenative regeneration conditions, removed from the regeneration zone and passed into said adsorption zone.

9. The process of claim 1 wherein catalyst withdrawn from the alkylation zone is regenerated prior to its recycle to the adsorption zone.

* * * * *